US006911643B2

(12) United States Patent
Zadravec

(10) Patent No.: US 6,911,643 B2
(45) Date of Patent: Jun. 28, 2005

(54) NIGHT-VISION DEVICE

(75) Inventor: Dusan Zadravec, Rebstein (CH)

(73) Assignee: Leica Geosystems A.G., Heerbrugg (CH)

(*) Notice: Subject to any disclaimer, the term of this patent is extended or adjusted under 35 U.S.C. 154(b) by 303 days.

(21) Appl. No.: 10/312,066

(22) PCT Filed: Jun. 26, 2001

(86) PCT No.: PCT/EP01/07276
§ 371 (c)(1),
(2), (4) Date: Mar. 10, 2003

(87) PCT Pub. No.: WO02/01273
PCT Pub. Date: Jan. 3, 2002

(65) Prior Publication Data
US 2003/0155485 A1 Aug. 21, 2003

(30) Foreign Application Priority Data
Jun. 26, 2000 (EP) .................................. PCT/EP00/05924

(51) Int. Cl.$^7$ ................................................ H01J 40/14
(52) U.S. Cl. ............................. 250/214 VT; 250/216; 313/524
(58) Field of Search .................... 250/214 VT, 216; 359/400, 407–409, 480; 313/524

(56) References Cited

U.S. PATENT DOCUMENTS

| 4,124,798 A | * | 11/1978 | Thompson | ............ 250/214 VT |
| 4,728,786 A | * | 3/1988 | Sciamanda et al. | ... 250/214 VT |
| 4,828,378 A | * | 5/1989 | Ellis | ............................ 359/400 |
| 5,416,315 A | * | 5/1995 | Filipovich | ............. 250/214 VT |
| 5,579,165 A | * | 11/1996 | Michel et al. | ............... 359/630 |
| 5,764,417 A | * | 6/1998 | Francois et al. | ............. 359/630 |

FOREIGN PATENT DOCUMENTS

| EP | 0252200 A1 | * | 1/1988 |
| EP | 0381449 A2 | * | 2/1989 |

* cited by examiner

Primary Examiner—Thanh X. Luu
Assistant Examiner—Stephen Yam
(74) Attorney, Agent, or Firm—Van Dyke, Gardner, Linn & Burkhart, LLP

(57) ABSTRACT

The invention relates to an especially monocular night-vision device comprising a lens (11) and lens systems (53, 57, 77) which project the light strengthened by means of a residual light amplifier (33) in a pre-determined wave range, onto a receptor lying on a receiving beam axis (9), such as a human eye (99). Reflective elements (13, 35, 75, 97) bend the beam path of the light through the night-vision device. The reflecting surfaces of at least one pair of the reflective elements (35, 75) are oriented in a coplanar manner. At least one optical component (33, 53, 55, 57, 77) is provided between at least one pair of the four reflective elements (13, 35, 75, 97).

18 Claims, 3 Drawing Sheets

NIGHT-VISION DEVICE

Figure 1A:
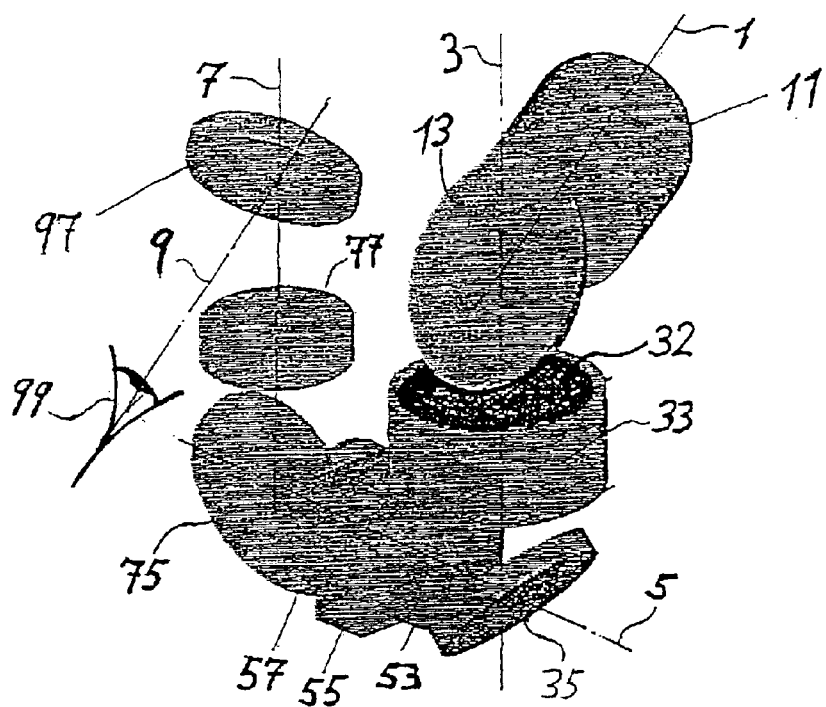

The invention relates to a night-vision device, more particularly monocular, according to the preamble of claim 1 as well as to a device for the coupling in and coupling out of optical signals, particularly for being used in such a night-vision device, according to claim 9.

Night-vision devices are essentially designed according to the following principles. An object lens, preferably fast, focusses the rays issuing from a subject to be observed to the input window of a residual-light amplifier. There the image of the subject is electronically amplified and because of the phosphorescent coating at the exit of the residual-light amplifier appears as a light green image on the amplifier's output window. The subject's amplified, green image is inverted via an optical image inverter system associated with, but where applicable separate from, the residual-light amplifier. This green image is projected into the user's eye via an eyepiece.

This results in a heavy, relatively expensive night-vision device of long build having an unfavorable position of the center of mass in applications that are not hand-held.

From WO 96/10764, a monocular night-vision device is known in which two reflective optical elements having one reflecting surface each are arranged between the residual-light amplifier and the eyepiece. These reflecting surfaces, mutually offset, are oriented against one another. This night-vision device, too, has the structural disadvantages of conventional night-vision devices.

From U.S. Pat. No. 4,000,419, furthermore, a coupling-in device for the coupling in of optical signals into the beam path between the final element of a night-vision device on the side of the eye and the user's eye is known. Depending on the particular situation, such a device can be attached to a night-vision device intended for it. By attaching the coupling-in device, the pupillary distance is necessarily reduced, which significantly reduces the wearing comfort, particularly for wearers of glasses, and there may be situations where an optical post-adjustment is required.

The invention, to the contrary, is based on the task of providing a night-vision device that has a residual-light amplifier, where necessary with a conventional inverter, but which brings a distinct reduction of the length, weight, and production cost of the device. The distance between the device's center of mass and the user's head should also be reduced, particularly in applications that are not hand-held. Moreover, depending on the applicable situation, there is the underlying aim of adding or extracting visual information via additional devices.

This is achieved according to the invention, by realizing the characterizing features of claim 1 and claim 9, respectively. If it is said there that the optical axis of the device's object lens is supposed to be "essentially" parallel to the axis that leads to the receptor, then small departures from parallelism may in certain cases result from parallax balance. If it is said that the beam path between the residual-light amplifier and the receptor is determined by reflective optical elements, then this does not at all exclude the simultaneous use of lens systems with refractive elements. We wish to make sure here that by the expression "definition of the beam path between residual-light amplifier and receptor", the bending of the optical axis of the beam of rays is to be understood.

Advantageous or alternative embodiments are described by the characteristics of the dependent claims.

In the invention, the beam path is bent on principle by reflective optical elements between the residual-light amplifier and a receptor such as, for instance, the human eye and between the residual-light amplifier and the subject. This leads to a considerable reduction in weight and length of the device that is advantageous for the wearing comfort of a device according to the invention, as well as to a reduction of production costs. In addition, the solution according to the invention that has four reflective optical elements can offer the possibility of a direct observation of the subject (like for instance through sun glasses) and simultaneous perception of its amplified, generally green image that is superimposed on the "direct" image. The reflective surface of the first reflective element that is associated with the receptor will not restrict the field of vision for viewing without the amplified residual light when made of an appropriate size.

In an embodiment of the device according to the invention, the eyepiece can be in two parts when the reflective surface associated with the receptor is designed without the possibility of simultaneous viewing of the "direct" image. A first part of the eyepiece is arranged on the receptor ray axis between the mirror associated with the receptor and the receptor, and a second part of the eyepiece is arranged between the mirror associated with the receptor and the residual-light amplifier. It thus becomes possible to realize a device of smaller size and thus additionally optimize the position of the device's center of mass in applications.

A complete image inversion is possible when employing reflective elements. Then a specific inverter can be left out. In addition, individual reflecting surfaces may be integrated into other components of the device (for instance, into the eyepiece mirror) unless the mirrors are arranged in an uninterrupted sequence, and larger freedom of design is gained for the beam path bending.

By bending of the beam path, a given beam path can be adapted more closely to the geometric situation, and compact overall dimensions appropriate to given applications can be realized. Thus, an optimum position of the center of mass of the device can be achieved, particularly in helmet-based applications. For hand-held applications, too, shapes that are ergonomically advantageous can be achieved.

Further improvements are achieved by a bending of the beam path that can be selected variably, in which case the optical axis of the object lens and the axis of the receptor ray can be rotated relative to other components between them. Generally, attention will have to be paid to the fact that this rotation must always be mutually parallel. If pivoting motions of one of these axes become necessary in addition, then the other axis would have to perform the corresponding counter-pivoting motions in mutually parallel planes.

It thus becomes possible to adapt a particular device to the individual situation of the user, and additional flexibility is gained in possible system integrations of the device, for instance as a night aiming device in daylight aiming devices, daylight range finders, compasses and the like.

Even essentially mirror-symmetric modifications of the device can be visualized, so that it becomes superfluous to provide left and right versions of the device.

Two monocular devices can of course be combined into a binocular night-vision device. Depending on the situation, two identical devices can be combined on site to hand-held or helmet-based night-view goggles. The bent beam path makes possible a larger object lens separation for stereoscopic residual-light viewing in such a case.

The coupling-in and coupling-out device according to the invention offers the possibility of visual, silent information exchange even during residual-light observations (situational awareness), for instance when employed in action. According to the invention, this device is designed so that the distance between receptor and night-vision device is not impaired by the coupling-in or coupling-out device and that the latter can be plugged in or out in the field, occasionally even while the night-vision device is in operation. In the part of the beam path where the coupling-in or coupling-out device is inserted, the optical beams preferably are collimated. This makes it possible that a coupling-in or coupling-out module inserted into the beam path will have no effect on the beam path all the way to the receptor, i.e., constant viewing comfort is available even for wearers of glasses.

The most diverse applications are available for information to be coupled in, which most favorably would be differentiated in its color from the residual-light image: Orientation information (e.g., compass, GPS, distance information), target information (position of a potential target, susperimposed upon the residual-light image), alphanumeric instructions for action; an electronically adjustable haircross can be realized when integrating the device into an aiming system; blending in of image sequences from other positions and viewpoints, etc.

The most diverse applications for information to be coupled out are for instance: documentation of the situation found, and of own actions executed (for instance, police sharpshooters etc.), transmission of image sequences from one's own position to deciders and combat partners.

A modular design of the coupling-in and coupling-out device is distinguished, on one hand for its user friendliness and on the other hand for its great flexibility. Thus, the mutual dependence between the coupling-in or coupling-out device and the device into which this is received, will be minimized by providing a simple, reliable hardware interface in the form of a device socket. The user can carry such coupling-in or coupling-out devices and, depending on the application, plug them into a night-vision device or, where applicable, into another optical device having the corresponding device socket. Technical progress made in the coupling-in or coupling-out devices will have no negative influence on the technical level of an optical device provided with a corresponding device socket so long as the mechanical and optical design of the coupling-in or coupling-out device remains unchanged.

Figure 1B:
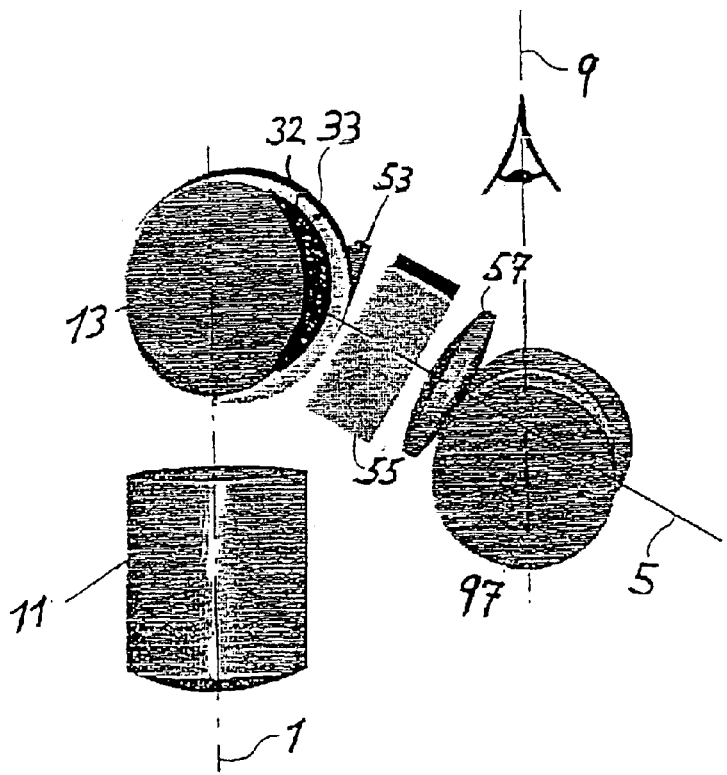
Figure 1C:
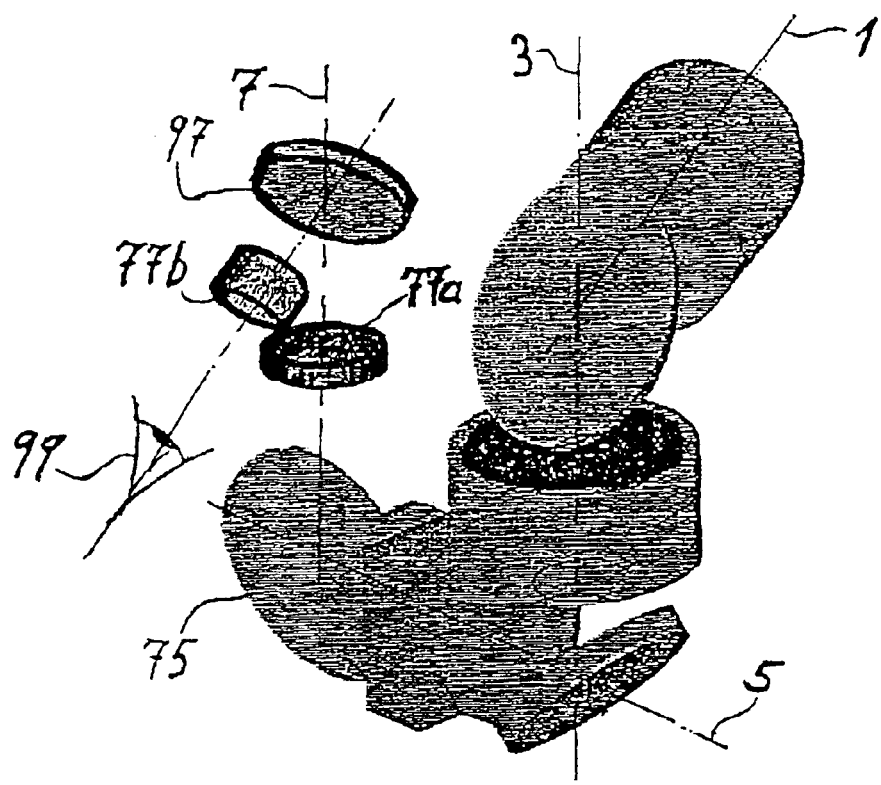
Figure 2A:
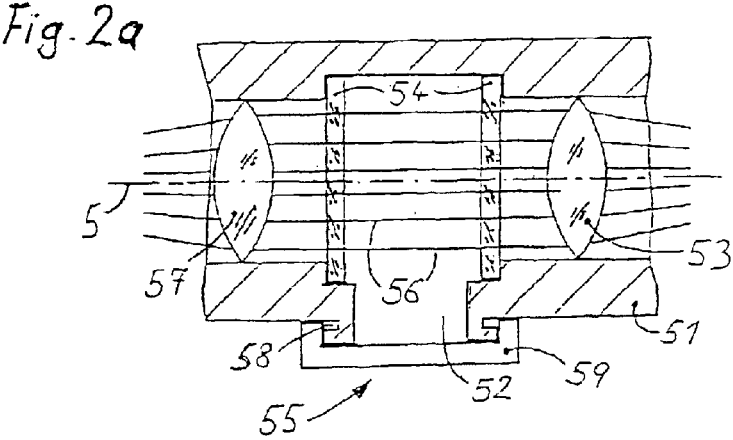
Figure 2B:
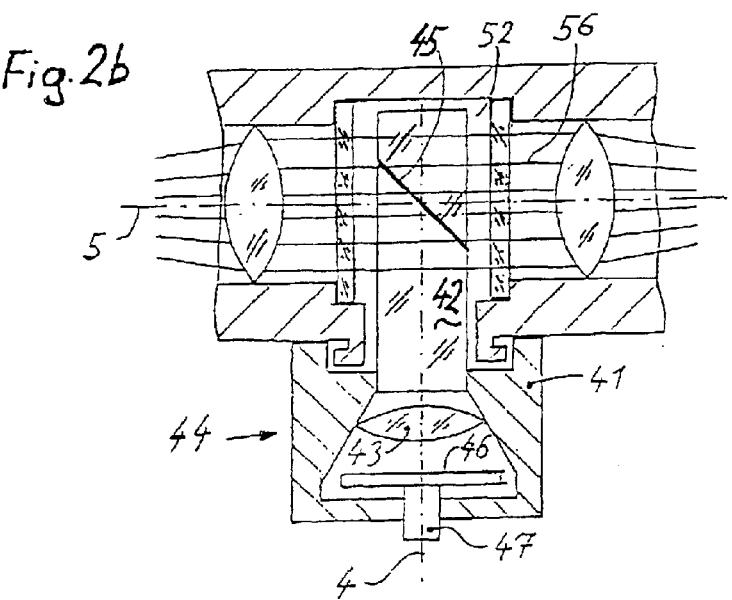
Figure 2C:
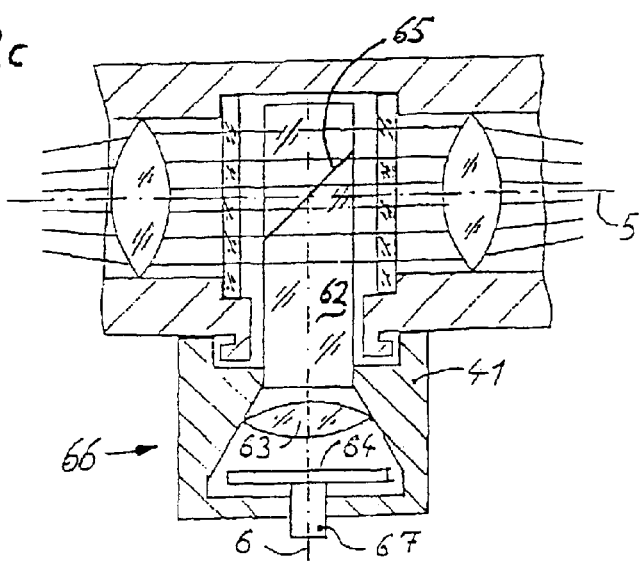

In the following the invention will be explained in greater detail and purely in terms of examples while referring to the embodiment variants represented in the figures of the drawing. The same designations and reference numerals are given to the same parts appearing in different exemplary embodiments and performing the same functions. Shown are:

in FIG. 1a an oblique-view representation of optical elements of a night-vision device according to the invention having a device socket for a coupling-in or coupling-out device for a visual information exchange;

in FIG. 1b a top-view representation of the optical elements of a rotatable embodiment of a night-vision device according to the invention;

in FIG. 1c an oblique-view representation of optical elements of a further embodiment of a night-vision device according to the invention with a device socket for a coupling-in or coupling-out device as well as a two-part eyepiece;

in FIG. 2a a lateral sectioned representation of an embodiment of a device socket according to the invention;

in FIG. 2b a lateral sectioned representation of a coupling-in device according to the invention for information exchange; and in FIG. 2c a lateral sectioned representation of a coupling-out device according to the invention for information exchange.

FIG. 1a shows the essential optical components of an embodiment of a monocular night-vision device according to the invention as well as their mutual arrangement. This embodiment comprises a residual-light amplifier 33, an object lens 11 having an object axis 1, an eyepiece 77 having an eyepiece axis 7, lens systems, and four reflective optical elements with one reflecting surface each that are arranged in pairs subtending specific angles relative to each other. The reflective optical elements will generally be planar but may occasionally have a slightly aspherical shape. Instead of plane mirrors, reflecting prisms can be provided as the reflective elements. In FIG. 1a, the respective reflecting surfaces for instance are oriented as in a conventional Porro 2 system of prisms. In contrast to such a conventional system of prisms providing complete image inversion, however, the reflecting surfaces here are not arranged in a self-contained assembly but are associated with different optical components of the night-vision device according to the invention, either individually or as a coplanar pair, that is, a pair having a common plane of incidence for optical rays.

The rays issuing from the subject are focussed by the object lens 11 via the first reflective element that is made in the shape of the object lens mirror 13, onto the input window 32 of the residual-light amplifier 33. The object lens mirror 13 is so oriented that the object lens axis 1 subtends a right angle with the optical axis of the residual-light amplifier 33, which is the amplifier axis 3. The beam of rays amplified by the residual-light amplifier 33 is again reflected by the second optical element that is made in the shape of the amplifier mirror 35. Here the amplifier mirror 35 has an orientation such that the central axis of the reflected beam of rays is parallel to a connecting axis 5. In this embodiment, for instance, the connecting axis 5 is normal to the plane going through the object lens axis 1 and the amplifier axis 3. The light rays reflected by the amplifier mirror 35 are transformed by a collimator lens system 53 to a preferably collimated beam of rays parallel to the connecting axis 5. This preferably collimated beam of rays may cross a device socket 55 provided in this place. Then the beam of rays can be focussed by a focussing lens system 57 before being once more deflected in a direction parallel to the amplifier axis 3 via a third reflective element that is made in the shape of a connecting mirror 75 to the amplifier mirror 35. The central axis of the beam of rays reflected at the connecting mirror 75 coincides with the optical axis of an eyepiece lens system 77, which is the eyepiece axis 7. The amplifier mirror 35 and the connecting mirror 75 have a common plane of incidence here going through the amplifier axis 3, the connecting axis 5 and the eyepiece axis 7. The eyepiece lens system 77 indirectly projects the beam of rays reflected at the connecting mirror 75 via the fourth reflective element that is made in the shape of the receptor mirror 97, into the eye 99. Here the receptor mirror 97 is oriented in such a way that the receptor ray axis 9 of the beam of rays reflected at the receptor mirror 97 is parallel to the object lens axis 1. Since the receptor mirror 97 can moreover be made so as to have a wavelength-dependent transmissivity, then the amplified night-vision image can be superimposed onto the real image (see-through system). A slight horizontal and vertical parallax shift is seen, only for subjects located in the immediate vicinity.

FIG. 1b shows an embodiment of a monocular night-vision device that has the same optical components as the night-vision device of FIG. 1a. In contrast to the embodiment in FIG. 1a, however, the reflecting surfaces are not oriented as in a Porro 2 system of prisms. Moreover, in this embodiment, optical elements are interconnected rotatably about axes. Thus, on one hand the object lens mirror 13 and the object lens 11 connected therewith are supported rotatably about the amplifier axis 3. On the other hand, the receptor mirror 97 in its turn is supported rotatably about the eyepiece axis 7. Here the amplifier mirror 35, the collimator lens system 53, the device socket 55, the focussing lens system 57 and the connecting mirror 75 are rigidly interconnected via a connecting piece (not represented). Precautions must be taken at any rate that even after a possible rotation of the receptor mirror (97) and object lens mirror (13) the parallelism between the receptor ray axis 9 and the object lens axis 1 is preserved. This can for instance be achieved by so-called click stops or catches arranged in an identical fashion over the rotating zones. This parallel rotation could also be forced by a corresponding mechanical device. A paraxial rotation of the receptor mirror 97 and object lens 11 has several advantages at once. By rotating both the receptor mirror 97 and the object lens 11 through 180°, the monocular night-vision device of FIG. 1b which here is adapted for right-eyed observations could basically be adapted for left-eyed usage. Paraxial rotation of the receptor ray axis 9 and the object lens axis 1 can generally also be used, as shown in FIG. 1b, to optimize the beam path and thus the position of the device's center of mass for a commonly adopted attachment to the helmet while allowing for the individual situation of the users. Here the distance between the device's center of mass and the axis of rotation of the helmet on the user's head should be kept as short as possible.

FIG. 1c shows a further embodiment of a night-vision device according to the invention having a fully silvered receptor mirror 97. In contrast to the embodiments of FIGS. 1a and 1b, only the residual-light-amplified image can be seen here, but not in addition the "direct" image. Instead, the eyepiece 77 is divided according to the invention into two eyepiece parts. A first eyepiece part 77a remains located between the receptor mirror 79 and the connecting mirror 75. A second eyepiece part 77b is arranged on the receptor ray axis 9 between the receptor mirror 97 and the receptor 99. It becomes possible in this way to realize the device in a smaller size and thus to additionally optimize the position of the device's center of mass in applications. Precautions must be taken that the second eyepiece part 77b is rigidly attached to the receptor mirror 97 if this embodiment is designed as a rotatable night-vision device according to the embodiment variant of FIG. 1b.

It can be seen from FIGS. 1a, 1b, and 1c that the distribution of components that is presented is based on considerations of technical manipulation, that is, compact size, handiness, a favorable center of mass, etc. Of course, for a given optical functioning of the device, the individual components could be arranged in different ways between the reflective elements. For instance, the residual-light amplifier 33 could also be located between the amplifier mirror 35 and the connecting mirror 75, or even between the connecting mirror 75 and the receptor mirror 97.

FIG. 2a shows a possible embodiment of a device socket 55, for instance for a night-vision device according to FIGS. 1a, 1b, and 1c, that is located in the connecting piece between the amplifier mirror 35 and the connecting mirror 75. The recess 52 provided for it in the connecting housing 51 encompasses for instance all of the beam cross section of the beam of rays 56, preferably collimated. Coupling-in and coupling-out devices for the coupling in or coupling out of visual information can of course also be realized if only part of the beam path is available for that purpose. In this embodiment, the beam of rays 56 that has been oriented parallel to the connecting axis 5 by the collimator lens system 53, and is preferably collimated, enters the recess 52 of the device socket 55 through a first, plane parallel sealing window 54. After passing through the recess 52, the beam of rays 56, preferably collimated, passes through a second plane parallel sealing window 54, and then impinges upon the focussing lens system 57. With this arrangement according to the invention, on one hand a gas-tight separation of the device socket 55 from the inner space of the night-vision device that is filled with protective gas is guaranteed, on the other hand insertion of a partly transparent holder such as a plane parallel glass body for the coupling-in or coupling-out element can occur through the beam of rays 56, preferably collimated, into the recess 52, without impairing the beam path of the night-vision device. Of course, a coupling in or coupling out could also occur at other places of the device, and even in parts of the beam path that are not collimated, but the embodiment described in FIG. 2a is advantageous because of its simplicity of design and its flexibility between different device types having an identical device socket concept. The notch 58 found at the connecting housing 51 which cooperates with a locking mechanism (not shown in FIG. 2a) allows a protecting cover 59 to be fastened which is supposed to prevent contamination and mechanical damage to the device socket 55.

FIG. 2b shows an embodiment of a coupling-in or coupling-out device according to the invention that is made in the shape of the coupling-in module 44. As shown, the coupling-in module 44 is inserted into the device socket 55 and locked. In this situation the module housing 41 overlaps the notch 58 and the locking elements (not shown in FIG. 2b) become engaged. An optically conducting support 42 for the coupling-in element, for instance a glass block which in addition to two plane parallel faces normal to the connecting axis 5 comprises the coupling-in element 45, for instance a physical beam splitter, in FIG. 2b is inserted in such a way into the recess 52 that the entire beam of rays 56 passes through it. However, the splitter area of the coupling-in element 45 may also be very small. The splitter layer preferably has a composition such that at the wavelengths emitted by the residual-light amplifier it has a transmission maximum. The coupling-in element 45 has an orientation in the support 42 for the coupling-in element which is such that the coupling-in axis 4 of the projection optics 43 is coupled into the beam path parallel to the connecting axis 5 in the direction of the focussing lens system 57. The radiant surface can be a display 46, for instance an actively illuminated LCD screen, an LED display or some other light-emitting surface. The information presented on the LCD screen 46 is made available via the coupling-in data interface 47. Apart from alphanumeric characters or graphical symbols, even moving pictures such as those coming from a thermal-image optical sight can be made available after appropriate scaling. A "sensor fusion" of the most diverse sensors becomes possible by such an arrangement.

FIG. 2c shows an embodiment of a coupling-in or coupling-out device according to the invention made in the shape of the coupling-out module 44. The coupling-out module 66 is realized in an analogous way in the same module housing 41. The support 62 for the coupling-out element which has the same outside dimensions as the support 42 for the coupling-in element of FIG. 2b comprises more particularly, contrarily, a coupling-out element 65 which reflects 10 to 20% of the rays emitted from the residual-light amplifier. The coupling-out element 65 is oriented in such a way that it deflects a coupling-out axis 6 of an imaging optics 63 parallel to the connecting axis 5 in the direction of the collimator lens system 53. Instead of the radiating surface, a receiving surface is found in the coupling-out module 66, such as a sensitive CCD array 64. The visual information that is coupled out is made available for instance through the coupling-out data interface 67.

Basically, a combined coupling-in and coupling-out device having one coupling-in element and one coupling-out element each at a common element support is feasible.

Both the coupling-in data interface 47 and the coupling-out data interface 67 of the coupling-in module 44 or coupling-out module 66 can be connected with radio equipment advantageously having its antenna at the helmet of the user. Wireless transmission of the optical information thus becomes possible.

What is claimed is:

1. A monocular night-vision device with an object lens focusing residual light issuing from a subject to be observed onto an input window of a residual-light amplifier with lens systems projecting the residual light that has been amplified by the residual-light amplifier within a given range or wavelengths onto a receptor located on a receptor ray axis and with at least reflecting elements bending the beam path of the light through the night-vision device, comprising:

wherein the first, second, third, and fourth reflective elements each have a reflecting surface having a mutual pairwise orientation under an invariable angle;

wherein said first reflective element directs the incident light coming from the direction of an object lens axis which in general contains the object lens into the direction of an amplifier axis which in general contains the residual-light amplifier, the second reflective element directs the light into the direction of a connecting axis which, where applicable, contains a device socket for a coupling-in or coupling-out device, the third reflective element directs the light into the direction of an eyepiece axis which in general contains an eyepiece, and the fourth reflective element directs the light into the direction of the receptor axis which, essentially, is parallel to the object lens axis;

wherein the reflecting surfaces of at least one pair of the reflective elements are in coplanar alignment;

at least one optical component between at least one pair of the four reflective elements, said at least one optical component chosen from: the object lens, at least one object lens part of an object lens that, where applicable, is made in two parts, the residual-light amplifier, the eyepiece, at least one eyepiece part of an eyepiece that, where applicable, is made in two parts, and at least one device socket for a coupling-in or coupling-out device;

wherein a reflecting surface of a reflective element located on the receptor ray axis is essentially reflective for the given range of wavelengths of the residual-light amplifier and, where applicable, to the contrary, is essentially transparent for other ranges of wavelengths; and wherein the first reflective element can be rotated about the amplifier axis and the fourth reflective element can be rotated about the eyepiece axis relative to the reflective elements arranged between them, while maintaining the parallelism of the object lens axis and the receptor ray axis.

2. Night-vision device according to claim 1 wherein said eyepiece is made in two parts and that the fourth reflective element is arranged between the two eyepiece parts.

3. Night-vision device according to claim 1 wherein the four reflecting surfaces of the four reflective elements which preferably are in the shape of plane mirrors or reflecting prisms are oriented essentially in the same way as in a conventional Porro 2 system of prisms.

4. Night-vision device according to claim 1 adaptable to be integrated into an aiming device.

5. Night-vision device according to claim 1 wherein the image supplied via the residual-light amplifier to the receptor has an enlargement factor of essentially unity.

6. Night-vision device according to claim 1 wherein at least one of the reflecting surfaces is aspherically shaped.

7. Night vision device according to claim 1 wherein the first reflective element can be rotated about the amplifier axis and the fourth reflective element can be rotated about the eyepiece axis, each mirror-symmetrically relative to the connecting axis, where applicable engaging through catches provided.

8. Night-vision device according to claim 1 including a coupling-in or coupling-out device in one part of the beam path containing essentially collimated rays between the residual-light amplifier and the eyepiece for the coupling in of optical signals and/or for the coupling out of at least one part or the amplified residual light portion into/from this beam path.

9. Night-vision device according to claim 8 wherein the device socket is shaped as a recess while the boundaries of the night-vision device against the recess which are in the beam path are provided with at least two transmissive sealing windows.

10. Night-vision device according to claim 1 including a coupling-in or coupling-out device having at least one chosen from an essentially reflective coupling-in element and a reflective coupling-out element arranged on an element support wherein the coupling-in or coupling-out device is made so that it can be inserted in a modular way into an essentially collimated beam path of the night-vision device and that the reflective coupling-in element and/or the reflective coupling-out element subtend an angle of more particularly 45° with the respective optical axis associated with this beam path, and where the signals to be coupled in or out are made available through respective data interfaces.

11. Night-vision device according to claim 10 including an image display such as a graphical or alphanumerical display and an associated projection optics having at least one lens in order to make available the signals to be coupled in.

12. Night-vision device according to claim 10 including an arrangement to process coupled-out signals, a coupling-out interface for displaying the image of the subject to be observed on a monitor or for transmitting the image to a receiver system.

13. Night-vision device according to claim 10 wherein the coupling-in element is made to be transmissive for a particular wavelength, more particularly for a wavelength given by a residual-light amplifier.

14. Night-vision device according to claim 12 wherein said arrangement comprises a CCD array.

15. Night vision device according to claim 10 wherein said data interfaces comprise optical data interfaces.

16. Night-vision device according to claim 9 wherein said at least two transmissive sealing windows comprise plane parallel glass plates.

17. Night-vision device according to claim 8 wherein said coupling-in or coupling-out device is between the second and third reflective elements.

18. Night-vision device according to claim 6 wherein said at least one of the reflecting surfaces is at the fourth reflective element.

* * * * *

UNITED STATES PATENT AND TRADEMARK OFFICE
CERTIFICATE OF CORRECTION

PATENT NO. : 6,911,643 B2
DATED : June 28, 2005
INVENTOR(S) : Dusan Zadravec

It is certified that error appears in the above-identified patent and that said Letters Patent is hereby corrected as shown below:

<u>Column 6,</u>
Line 67, "or" should be -- of --.

<u>Column 8,</u>
Lines 1 and 47, "Night vision" should be -- Night-vision --.
Line 12, "or" should be -- of --.
Line 18, "scaling" should be -- sealing --.

Signed and Sealed this

Second Day of May, 2006

JON W. DUDAS
*Director of the United States Patent and Trademark Office*